Oct. 3, 1939.   J. D. FERRY   2,174,555
FOOD PREPARING AND HANDLING APPARATUS
Filed May 22, 1935   3 Sheets—Sheet 3
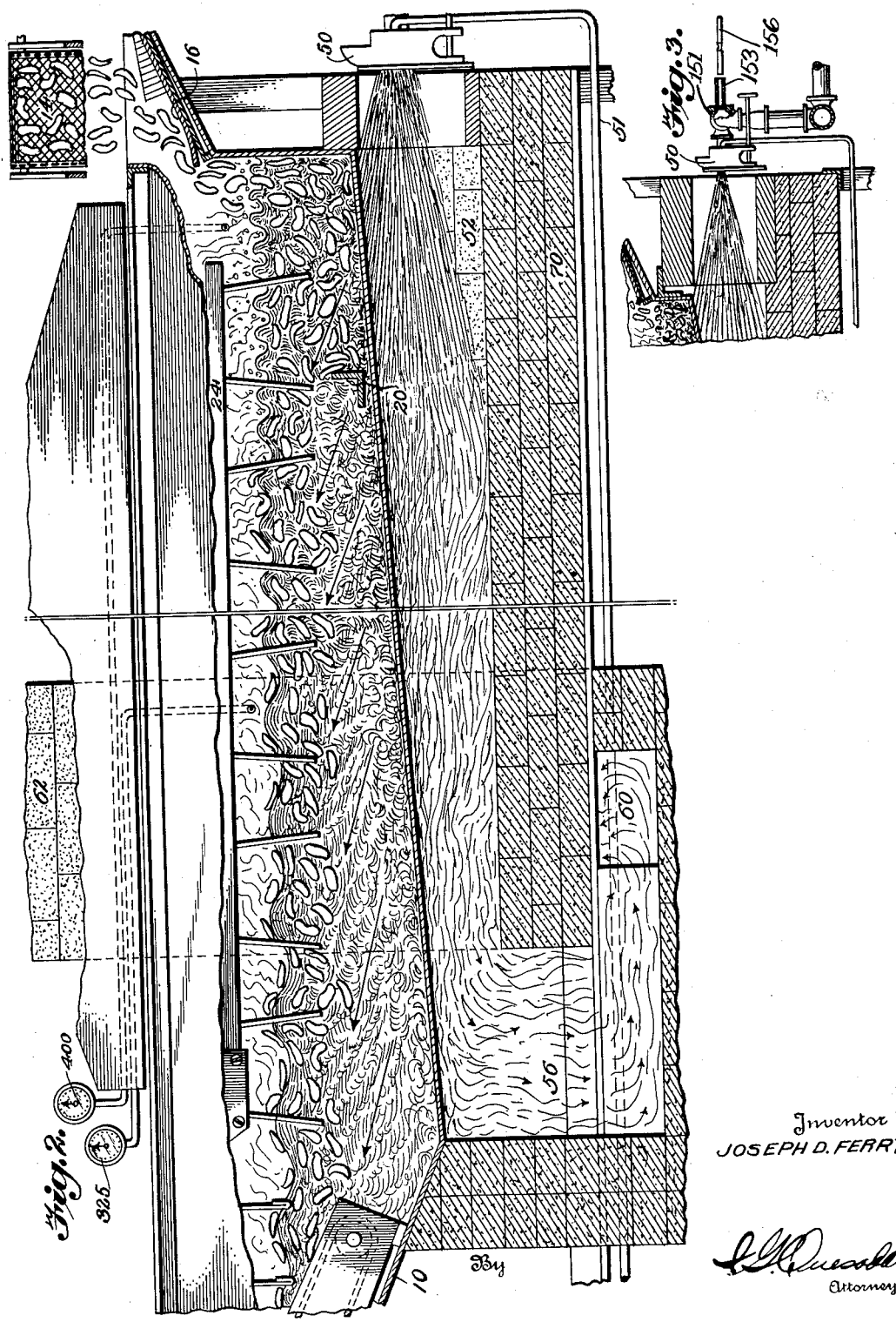
Inventor
JOSEPH D. FERRY Patented Oct. 3, 1939

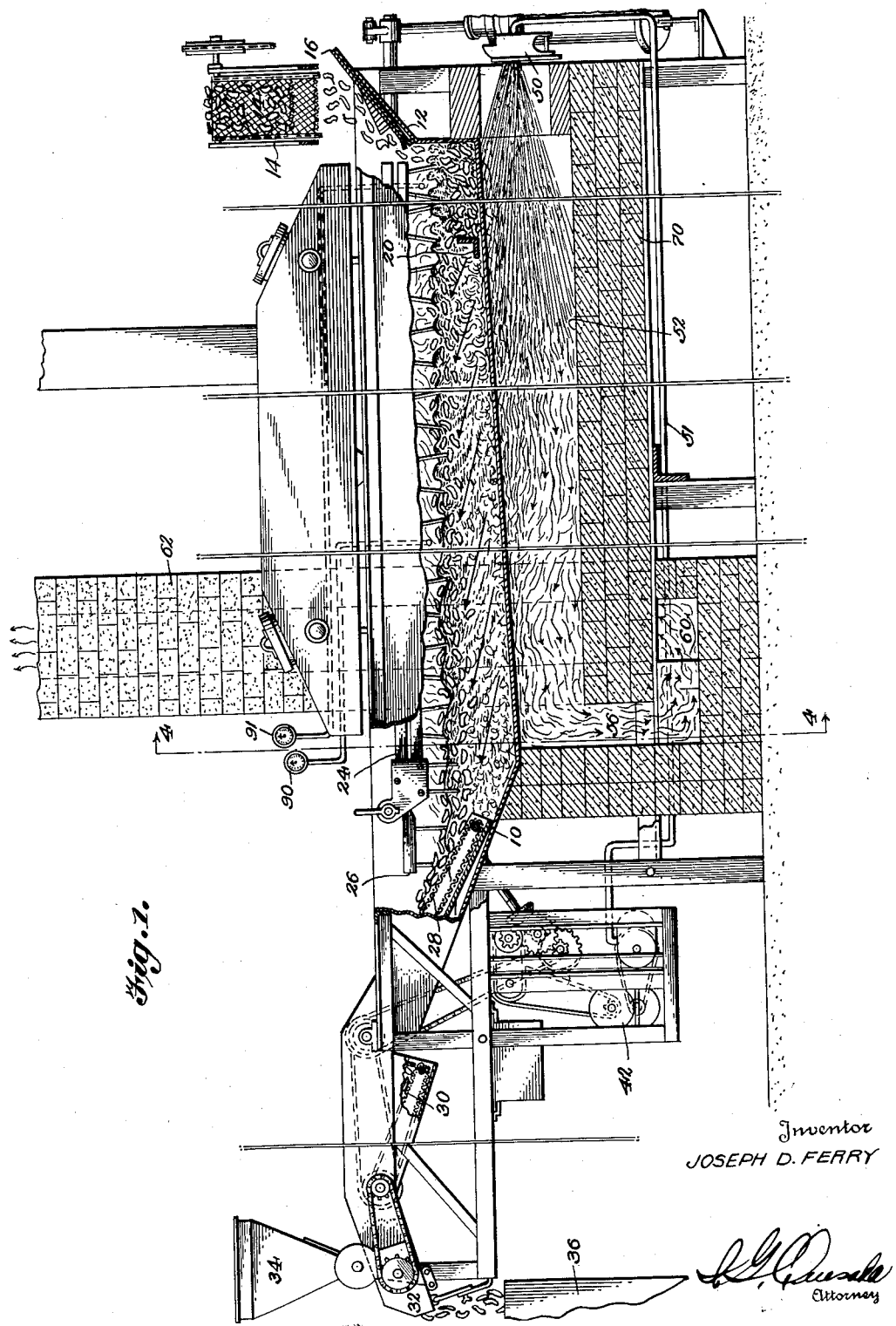

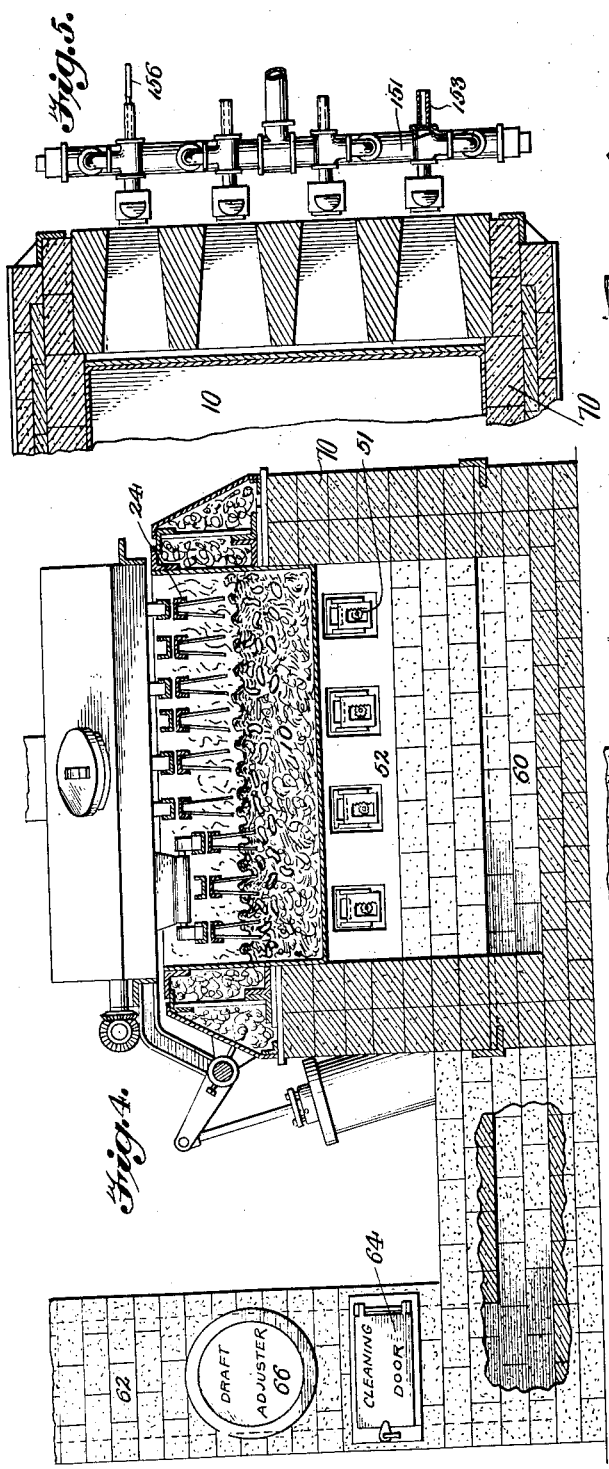
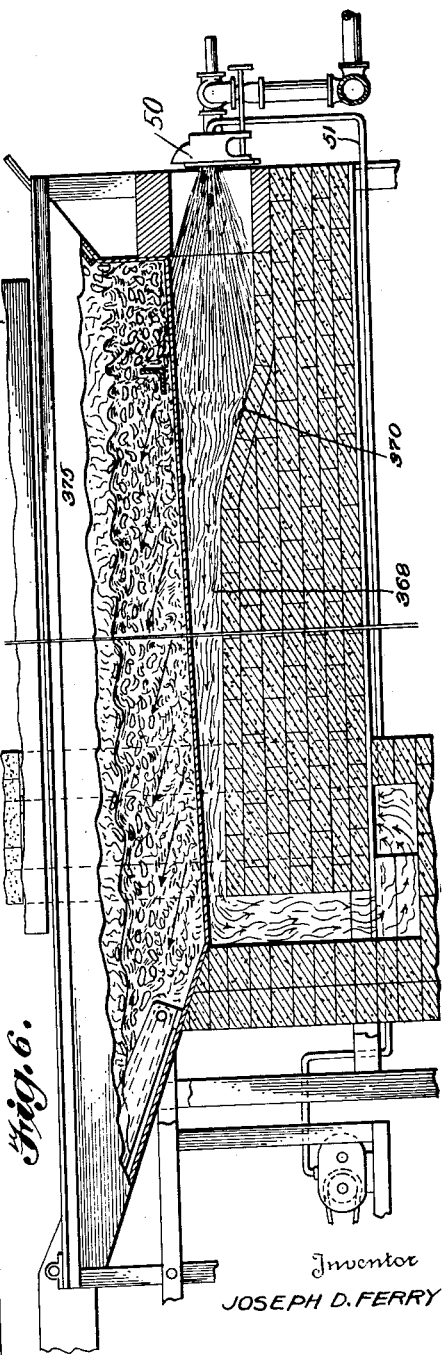

2,174,555

UNITED STATES PATENT OFFICE 2,174,555

FOOD PREPARING AND HANDLING APPARATUS

Joseph D. Ferry, Harrisburg, Pa.; Sylvia O. Ferry, executrix of said Joseph D. Ferry, deceased Application May 22, 1935, Serial No. 22,892

12 Claims. (Cl. 53—18)

This invention relates to food cooking equipment and the present application is a continuation in part of my application filed April 27, 1934, and serially numbered 722,779, which has matured into Patent 2,056,845 dated October 6, 1936.

The invention forming the subject of this application has special reference to a food frying unit embodied in food manufacturing equipment and will be found to look to a definitely variable differential as between the temperature of the cooking fluid in the inlet or anterior portion of a frying unit on one hand, and in the remaining portion of the frying unit on the other hand, to the end that the temperatures at different places in the same body of cooking fluid contained within the frying unit may be conveniently regulated to meet a newly appreciated need of the goods being handled. In this latter connection, it is observed that some potato slices, for example, because of the age or source of the potatoes from which the slices are cut, require more or less initial heat than others, and at the same time a gradually diminishing and controlled heat as the potato slices progress toward the discharge posterior portion of the frying unit, the relation of the temperatures at the inlet and advanced portions of the frying unit having been discovered to be of exceeding importance to give to the food being prepared, the crispness, uniformity, flavor and inviting appearance so necessary for commercial acceptance.

Another feature of the food manufacturing unit disclosed herein resides in the location of the heating unit at the inlet portion of the frying unit with the products of combustion from the heating unit directed quite definitely toward the outlet end of the frying kettle because it has been found that this arrangement offers material assistance to the gradual travel of the food products from the inlet to the outlet portion of the kettle.

In addition, the location of the heating unit at one end portion of the frying kettle and the controlled movement of the products of combustion toward the other end of the kettle, provides a gradually tapered or reduced kettle temperature toward one end of the kettle and avoids the intervening relatively cool spots which accompany the employment of a number of burners at longitudinally spaced points beneath the kettle, it being noted in passing that the presence of relatively cool regions or sections in the frying liquid at longitudinally spaced points along the kettle interferes with uniform progress of the food products toward the outlet of the kettle.

Other objects and advantages of the invention will be apparent during the course of the following description.

In the accompanying drawings, forming a part of this application, and in which like numerals are employed to designate like parts throughout the same, Figure 1 is a fragmentary vertical sectional view through a frying unit and associated parts, Figure 2 is an enlarged fragmentary vertical sectional view through the frying unit and the heating means therefor, Figure 3 is an enlarged fragmentary vertical sectional view through the end of the unit having the fuel burners, Figure 4 is a vertical transverse sectional view taken on line 4—4 of Figure 1, Figure 5 is a fragmentary horizontal sectional view through that end of the frying unit equipped with fuel burners, Figure 6 is a vertical longitudinal fragmentary sectional view through a modified form of the frying unit.

In the drawings, the numeral 10 generally designates a frying kettle or vat adapted for the reception of an appropriate quantity of cooling oil or other fluid and potato slices or other food to be fried or cooked. From Figures 1 and 3, it will be seen that the kettle 10 has a greater length than width and is provided with an inlet formed with an inclined bottom 12 for the reception of potato slices or the like. Suitable means such as a conveyor 14 may be employed to furnish a regulated supply of potato slices or other food products, to the kettle.

The said inlet to the kettle declines in the direction of the bottom of the kettle and has mounted thereon a receiving plate 16 cooperating with the inclined inlet end portion of the kettle to define an air space for cooling purposes. As will appear, the heat at the inlet portion of the kettle is intense, more so than at other points within the kettle, and it has been found that by spacing the plate 16 from the inlet end or inclined portion thereof, the resulting air space avoids overheating of the plate 16 and thus prevents the entering potato slices from sticking to the plate, or becoming scorched thereby.

When the potato slices or other food products enter the kettle by way of the inclined receiving plate 16, the same settle to the bottom of the kettle, and by reference to Figure 1 it will be seen that an L-shaped baffle or guard 20 extends entirely across the kettle at a point removed from the inlet end of the kettle, so as to cooperate with the inlet or anterior portion of the kettle in defining an initial cooking chamber and at the same time acting as a dam preventing the uncooked potato slices from creeping along the bottom of the tank. In other words, the baffle or dam 20 serves to arrest substantial advance of the potato slices until they have become light enough by cooking to rise above the baffle.

If desired, there may be several suitably spaced baffle plates corresponding to the member 20 and such arrangement will be found to be especially advantageous when working with potatoes from different sources, some requiring a longer time than others for frying. That is to say, it requires some slices longer than others to lighten under the initial cooking to a point where the same will rise to the surface of the cooking fluid or to a point above the level of the dam and when the slices do rise, the further cooking period is about the same for all potatoes. The baffle thus cooperates with the inlet end of the kettle in the formation of a chamber for the initial cooking of potato slices or other food products.

The baffle 20 is spaced slightly above the bottom of the kettle to define an intervening space or passage for the movement of the fine sediment which forms on the bottom of the kettle and creeps along the same toward one end thereof. Were the baffle in engagement with the bottom of the kettle, there would be caused a congestion of this sediment behind the baffle.

The regulated travel of the potato chips through the cooking solution is brought about in part, by the action of a plurality of spaced parallel rake-like longitudinally extending impellers 24 having depending tines adapted to extend slight distances into the cooking solution and engage the potato slices therein. Of course, the motion of the tines through the cooking solution is one-way and the return stroke of the tines is slightly above the level of the cooking solution and the food products therein. By this arrangement, there is maintained a generally one-way motion of the potato slices through the cooking solution.

As suggested in Figure 1, the impellers 24 carry puddling devices 26 by which the potato chips at the outlet portion of the kettle are directed onto a discharge conveyor 28.

The newly fried potato chips picked up by the discharge conveyor 28 are conducted to a point above the level of the cooking solution and are deposited on a second discharge conveyor 30 and from this latter conveyor the potato slices are directed to an outlet member 32 where the same are subjected to the action of a salting mechanism 34. Finally, the completed potato chips are directed into a receiver 36 of any suitable character.

An appropriate source of power 42 may be employed to operate the impellers 24 and the several conveyors 28 and 30; these matters, of course, having no special reference to the invention claimed herein.

It is clearly illustrated in Figures 1 and 2 that a source of heat 50 is located below the kettle adjacent to the inlet or anterior end portion thereof. Of course, the burner or battery of burners may be of the type required, for oil, gas, or other fuel, and will be found to be located at the receiving end of a combustion chamber 52 extending longitudinally of the kettle below the same for the conduct of the products of combustion longitudinally below the kettle from the inlet to the outlet or posterior end portion thereof.

It is shown in Figure 1 that feed lines 51 have connection with the heating unit 50 to furnish compressed air thereto for mixture with the oil, gas or other fuel. The air pressure may be fairly constant, possibly five pounds, and the range of heat varied by varying the stack draft, although if desired, the range of heat may be varied by a corresponding variation of the compressed air supply.

The combustion chamber is provided adjacent to the outlet end of the kettle with a downwardly directed branch 56 shown to have full communication with a rearwardly directed branch 60 by which the products of combustion are conducted into a stack 62. By reference to Figure 4, it will be seen that the stack 62 is provided with a door 64 which may be adjusted to check the draft through the combustion chamber and in this way vary the intensity of the heat at various points along the kettle.

In addition, the stack 62 may be furnished with a compensator 66 maintaining a constant draft within the chimney against the contrary influence of changing and varying winds. Since the compensator 66 is of a nature well-known to those conversant with such matters and is freely obtainable through ordinary trade channels, no detailed disclosure of this part will be found herein.

Since the heating element or elements are located solely at the inlet portion of the kettle, the same thus impart to the cooking fluid at the inlet end portion of the kettle, a temperature higher than that prevailing in the relatively advanced portion of the kettle. More particularly, the heat striking the kettle bottom at the inlet portion thereof passes along the underside of the kettle for the full length thereof, being directed through the combustion chamber 52 between the kettle and the member 70.

Of course, the combustion chamber 52 extends for the full width of the kettle and the burners 50 are sufficient in number and power to heat the cooking fluid entirely across the kettle for the full length thereof.

In general, it will be seen that the heater embodies the burners 50, the member 70 with its combustion chamber and the means to vary the draft through the combustion chamber, an example of such means being the stack 62 and parts associated with the stack.

As brought out in the opening paragraphs of this specification, the invention featured herein has special reference to the heating means for the contents of the kettle and will be found to provide a definitely variable differential as between the temperature of the cooking fluid in the inlet end portion of the kettle or in the initial cooking chamber thereof on one hand, and in the remaining portion of the kettle on the other hand.

That is to say, the manner of applying heat provides a uniformly tapering kettle heat from the inlet to the outlet of the kettle.

Also, as brought out in the opening paragraphs of the specification, some potato slices by reason of age or source of the potatoes from which the same were cut, require more or less initial cooking than others, and at the same time a gradually tapered and controlled heat as the potato slices progress toward the outlet end of the frying kettle, the relation of the temperature at the inlet and advance portions of the kettle having been discovered to be of major importance in giving to the potato chips, the crispness, uniformity, flavor and appearance so necessary for the commercial acceptance of the same.

In explaining the means for achieving a definitely and uniformly tapering kettle temperature it is pointed out that by varying the draft within the combustion chamber 52 or by increasing the air pressure employed for mixture with the gas or oil, as the case may be, the kettle temperature is raised in the outlet end portion of the kettle as compared to the temperature in the inlet end portion of the kettle, cutting down the decline or taper in the kettle temperature.

On the other hand, by diminishing the draft within the combustion chamber, or by decreasing the air pressure employed in connection with the heating unit 50, the temperature within the advanced portion of the kettle is lowered. In this way, the temperature differential in the inlet and advanced portions of the kettle, is regulated to suit the particular potatoes being handled and to produce chips of a superior quality, while at the same time, this arrangement provides for maximum production.

By reference to Figure 1, it will be seen that the inlet and intermediate portion of the kettle has connection with temperature gauges 90 and 91 and such gauges provide a means for determining the relative temperatures of fluid at longitudinally spaced points within the kettle, from which the operator is guided in the supply of fuel and the regulation of draft through the combustion chamber.

It is important to observe that the location of the burners 50 at one end portion of the cooking unit and the endwise direction of the heat from the burners toward the outlet of the kettle has been found to definitely assist in the travel of the chips toward the outlet of the kettle and at the same time, such heating of the solution agitates the cooking fluid and avoids pockets or regions of relatively low temperature, so that in addition to heating the fluid, the burners or the heat therefrom impart a definitely endwise movement to the fluid by which the travel of chips through the kettle is aided.

That is to say, the nature of the agitation of the cooking fluid due to the manner of applying heat thereto encourages and assists in the steady travel of the chips through the kettle.

The location of the heating unit at one end portion of the kettle and the controlled movement of the products of combustion toward the outlet end of the kettle provides a gradually tapered or reduced kettle temperature toward the outlet end of the kettle, and avoids the intervening cooler spots which would result from the employment of a number of burners at longitudinally spaced points beneath the kettle.

Attention is now invited to Figure 2, in which it is illustrated that the kettle is increased in depth in the direction of the outlet end portion thereof so as to further aid in providing a tapering or gradually diminishing kettle temperature toward the outlet end portion of the frying unit. That is to say, since the depth of the kettle fluid is increased toward the outlet end thereof, the temperature of such kettle fluid is correspondingly diminished and ever so gradually, in the direction of the kettle outlet, thereby further avoiding relatively cool regions or a step-by-step temperature drop such as would result from the longitudinal spacing of the burners.

The gradual deepening of the kettle toward the outlet end portion thereof is accompanied by a longitudinal decline of the kettle bottom toward the outlet of the unit and this, at the same time, diminishes the cross sectional area of the combustion chamber toward the outlet end thereof. This gradual reduction in the cross sectional area of the combustion chamber toward the outlet end thereof has the effect of increasing the density of the products of combustion and thus brings about the efficient use of the fuel being employed.

From the foregoing, it will be seen that the movement of chips through the frying kettle is accomplished by the concerted action of the impellers 24 and the manner in which heat is applied to the kettle, it being seen that the movement of the products of combustion along the inclined bottom of the kettle toward the outlet end thereof has the effect of directing the kettle contents substantially in the direction of the arrows present in Figure 2.

It will further be seen that the concentration of the heating means at inlet or anterior end portion of the kettle provides the greatest heat at the point where the chips enter what was previously described as the initial cooking chamber for food while from that point to the outlet or posterior end of the frying kettle, the heat is diminished ever so gradually as distinguished from a step-by-step reduction, thereby providing for the cooking of the chips with the required crispness, uniformity, flavor, and appearance required for acceptance by the trade.

It is important to observe that the burners are positioned so as to direct the maximum heat into contact with the fluid containing part of the kettle at the very inlet thereof. To this end, the various burners 50 are adjustably mounted upon the horizontally extending manifold 151. By reference to Figures 3 and 5 it will be seen that the burners 50 are provided with rearwardly directed tubular members 153 having sockets for the reception of a suitable hand bar 156 by which the burners may be adjusted about the longitudinal axis of the manifold 151.

By reason of the adjustable mounting of the burners 50, the maximum heat from such burners may be directed against the bottom of the fluid containing kettle at the very inlet thereof as distinguished from a point beyond such extreme end.

By directing the maximum heat against the fluid containing part of the kettle at the very inlet thereof, there is avoided a relatively cool region or section into which the potato slices would drop upon entering the kettle. It has been found that a relatively low temperature at the very point where the slices enter the cooking oil causes a serious congestion of the potato slices at this point. On the other hand, when maximum heat is directed against that part of the kettle bottom where the chips enter the fluid, the chips are immediately advanced into the region of the impellers.

The presence of relatively cool sections or regions within the kettle has the effect of shrinking the chips and in the production of chips lacking in uniformity, while a gradually tapering heat as the chips progress along the kettle not only definitely aids in the movement of the chips but at the same time looks to the production of chips of the required appearance, crispness and quality.

It is the uniform movement of chips along the kettle that is responsible for the production of chips of a uniform quality and appearance and such uniform movement is dependent on a gradually tapering kettle temperature as distinguished from alternating rises and falls in the kettle temperature due to longitudinal spacing of the burners along the kettle bottom.

In the form of invention illustrated in Figure 6, the bottom of the combustion chamber 368 is formed with a rise 370 at a point adjacent to the inlet of the kettle 375. More particularly, the combustion chamber is abruptly restricted at a point between the ends thereof so as to provide a greater heat concentration in the initial cooking chamber at the inlet end of the kettle 375.

Having thus described the invention, what is claimed is:

1. In a cooking unit for food stuffs, a kettle for the reception of food stuffs and a cooking liquid and having inlet and outlet portions, a heating device embodying a combustion chamber extending longitudinally below the kettle, said heating device also embodying a fuel burner adjacent to the inlet portion of the kettle, there being means to direct the products of combustion from said burner longitudinally through said combustion chamber and immediately below said kettle whereby the cooking liquid in the inlet portion of the kettle is subjected to the greatest heat and the cooking liquid in the remaining portion of the kettle is subjected to a gradually diminished heat, there being means providing a variable flow of air through said combustion chamber to correspondingly vary the range of the products of combustion through said combustion chamber and thus vary the temperature differential as between the liquid in the inlet portion of the kettle and the outlet portion of the kettle, the kettle being deepened lengthwise in the direction of the outlet end portion thereof.

2. In a cooking unit for food stuffs, a kettle for the reception of food stuffs and a cooking liquid, and having inlet and outlet portions, a heating device having a combustion chamber extending from the inlet portion of the kettle to a point adjacent the outlet portion thereof, said heating device embodying burners located entirely at one end portion of the combustion chamber and adjacent to the inlet portion of the kettle, there being means associated with the combustion chamber and the burners to vary the range of the products of combustion, in relation to the inlet and outlet portions of the kettle to provide a definitely variable temperature, as between the liquid in the inlet and outlet portions of the kettle, said kettle being deepened in the direction of the outlet portion thereof to increase the depth of the liquid in the kettle as the same approaches the outlet portion of the kettle.

3. An apparatus for cooking bodies of that type in which it is essential that the surface be quickly sealed against grease absorption and the water content reduced, comprising a tank for holding a body of cooking oil through which the bodies to be cooked are passed from the anterior to the posterior end, a source of heat so disposed with respect to said tank as to heat the oil body therein in a determined region at the anterior end of said tank to a sufficiently high temperature to immediately coat the bodies introduced into said anterior end with a cooked sealing crust, and to heat said oil body to a progressively diminishing temperature from the region of determined high temperature to the posterior end of said tank.

4. An apparatus for cooking bodies of that type in which it is essential that the surface be quickly sealed against grease absorption and the water content reduced, comprising a tank for holding a body of cooking oil, a source of combustion so disposed with respect to the bottom of said tank as to heat the oil body therein in a determined region at the anterior end of said tank to a sufficiently high temperature to immediately coat bodies introduced at said anterior end with a cooked sealing crust, and to heat said oil body to a progressively diminishing temperature from the region of determined high temperature to the posterior end of said tank for completing the cooking of said bodies as they pass to the posterior end of said tank, means cooperating with said source of combustion for determining the extent of the region of high temperature, and a flue for conducting the products of combustion against the bottom of said tank toward the posterior end thereof, the bottom of said tank inclining downwardly toward the posterior end whereby the volume to be heated increases as the available heat diminishes, accentuating declining heat gradient of the oil body.

5. An apparatus for cooking bodies of the type in which it is essential that the initial cooking stage be at an intense heat and the subsequent cooking stage at a progressively diminishing heat, comprising a tank for holding a body of cooking oil through which said bodies are passed from the anterior to the posterior end, a burner arranged to impinge flame against the bottom of the tank over a determined area adjacent the anterior end for producing the required intense heat, a flue for carrying the less intensely hot combustion products along the rest of the bottom of the tank toward the posterior end, said flue progressively tapering, and the bottom of said tank progressively inclining downwardly toward the posterior end whereby at successive vertical cross sections through said tank and flue, the areas of the oil body and flue vary in inverse ratio, which relationship produces optimum heat exchanging efficiency between the flue gases and oil as well as accentuating the decline of the heat gradient of the oil body.

6. An apparatus for cooking bodies of the type in which it is essential that the initial cooking stage be at an intense heat and the subsequent cooking stage be at a progressively diminishing heat, comprising a tank for holding a body of cooking oil through which said bodies are passed from the anterior to the posterior end, a combustion chamber beneath the anterior end of said tank, a flue for conducting combustion products from said combustion chamber against the bottom of said tank toward its posterior end, and a burner in said combustion chamber arranged to impinge flame against the anterior region of said tank bottom for heating it to the required high temperature, the products of combustion passing through said flue heating the oil body to a progressively diminishing temperature from the region of high temperature to the posterior end, said combustion chamber having an upwardly inclined wall for reflecting radiant heat against the area of the bottom of the tank against which the flame directly impinges.

7. An apparatus for cooking bodies of the type in which it is essential that the initial cooking stage be at an intense heat, and the subsequent cooking stage at a progressively diminishing heat, comprising a kettle for holding a body of cooking liquid through which said bodies are passed from the anterior to the posterior end, a wall beneath said kettle in spaced relation thereto and cooperating with the bottom of the kettle to define a relatively large combustion chamber at the anterior portion of the kettle and a restricted passage for conducting products of combustion from the combustion chamber to the posterior portion of the kettle, and a burner arranged to impinge flame against the bottom of the tank over a determined area adjacent the anterior end for producing the required intense heat.

8. An apparatus for cooking bodies of the type in which it is essential that the initial cooking stage be at an intense heat and the subsequent cooking stage at a progressively diminishing heat, comprising a kettle for holding a body of cooking liquid through which said bodies are passed from the anterior to the posterior end, a wall beneath said kettle in spaced relation thereto and cooperating with the bottom of the kettle to define a relatively large combustion chamber at the anterior portion of the kettle and a restricted passage for conducting products of combustion from the combustion chamber to the posterior portion of the kettle, and an adjustable burner to impinge flame against the bottom of the kettle over a determined area adjacent the anterior end for producing the required intense heat, said passage being gradually diminished in area toward the posterior end of the kettle.

9. An apparatus for cooking bodies of the type in which it is essential that the initial cooking stage be at an intense heat and the subsequent cooking stage at a progressively diminishing heat, comprising a kettle for holding a body of cooking liquid through which said bodies are passed from the anterior end to the posterior end, the bottom of said kettle progressively inclined downwardly toward the posterior end of the kettle, a wall beneath said kettle in spaced relation thereto and cooperating with the sloping bottom of the kettle in defining a relatively large combustion at the anterior portion of the kettle and a restricted passage for conducting products of combustion from the combustion chamber to the posterior portion of the kettle, said passage progressively diminishing in area toward the posterior end of the tank, and an adjustable burner to impinge flame against the bottom of the kettle over a determined area adjacent the anterior end of the kettle for producing the required intense heat, there being means for varying the temperature differential as between the liquid in the anterior portion of the kettle and the liquid in the remaining portion of the kettle.

10. An apparatus for cooking edible bodies of that type in which it is essential that the initial cooking stage be at a high temperature and the subsequent cooking stage at a progressively diminishing temperature comprising a tank for holding a body of cooking liquid through which the bodies to be cooked are passed from the anterior to the posterior end of said tank, a source of heat so disposed with respect to said tank as to heat the cooking liquid in a determined region at the anterior end of said tank to the required high temperature and to heat said cooking liquid to a progressively diminishing temperature from the region of determined high temperature to the posterior end of said tank, and means for effecting a controlled feed of said edible bodies in the direction of the posterior end of said tank.

11. An apparatus for cooking edible bodies of that type in which it is essential that the initial cooking stage be at a high temperature and the subsequent cooking stage at a progressively diminishing temperature comprising a tank for holding a body of cooking liquid through which the bodies to be cooked are passed from the anterior to the posterior end of said tank, a source of heat disposed with respect to said tank as to heat the cooking liquid in a determined region at the anterior end of said tank to the required high temperature and to heat said cooking liquid to a progressively diminishing temperature from the region of determined high temperature to the posterior end of said tank, and means intermittently dipping into the cooking liquid for engaging said edible bodies and effecting a controlled feed throughout toward the posterior end of said tank.

12. An apparatus for cooking edible bodies of that type in which it is essential that the initial cooking stage be at a high temperature and the subsequent cooking stage at a progressively diminishing temperature comprising a tank for holding a body of cooking liquid through which the bodies to be cooked are passed from the anterior to the posterior end of said tank, a definitely controllable source of heat so disposed with respect to said tank as to heat the cooking liquid in a determined region at the anterior end of said tank to the required high temperature and to heat said cooking liquid to a progressively diminishing temperature from the region of determined high temperature to the posterior end of said tank, and means intermittently dipping into the cooking liquid for engaging, immersing and effecting a controlled feed of said edible bodies toward the posterior end of said tank.

JOSEPH D. FERRY.